United States Patent
Takaoka

[11] Patent Number: 6,148,119
[45] Date of Patent: *Nov. 14, 2000

[54] CHARACTER RECOGNITION IN INPUT IMAGES DIVIDED INTO AREAS

[75] Inventor: Makoto Takaoka, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/594,798

[22] Filed: Jan. 31, 1996

[30] Foreign Application Priority Data

Feb. 1, 1995 [JP] Japan ................................ 7-036079

[51] Int. Cl.⁷ .................................................. G06K 9/32
[52] U.S. Cl. ......................... 382/289; 382/290; 382/296; 382/198
[58] Field of Search .................................... 382/198, 181, 382/185, 186, 203, 206, 286, 289, 290, 291, 292, 293, 295, 296, 297; 358/448

[56] References Cited

U.S. PATENT DOCUMENTS

| | | | |
|---|---|---|---|
| 5,020,117 | 5/1991 | Ooi et al. | 382/297 |
| 5,077,811 | 12/1991 | Onda | 382/46 |
| 5,235,651 | 8/1993 | Nafarieh | 382/46 |
| 5,301,036 | 4/1994 | Barrett et al. | 358/448 |
| 5,359,677 | 10/1994 | Katsurada et al. | 382/296 |
| 5,448,376 | 9/1995 | Ohta | 382/296 |
| 5,452,374 | 9/1995 | Cullen et al. | 382/296 |
| 5,461,459 | 10/1995 | Muramatsu et al. | 382/296 |
| 5,465,304 | 11/1995 | Cullen et al. | 382/296 |
| 5,517,587 | 5/1996 | Baker et al. | 382/296 |
| 5,537,489 | 7/1996 | Sinden et al. | 382/296 |
| 5,546,479 | 8/1996 | Kawanaka et al. | 382/296 |
| 5,625,466 | 4/1997 | Nakajima | 382/297 |

FOREIGN PATENT DOCUMENTS 0400881 12/1990 European Pat. Off. .

OTHER PUBLICATIONS

Patent Abstracts of Japan, vol. 018, No. 379 (P–1771), Jul. 15, 1994 & JP–A–06 103410 (Minolta Camera Co Ltd), Apr. 15, 1994, * abstract *.

*Primary Examiner*—Matthew C. Bella
*Attorney, Agent, or Firm*—Fitzpatrick, Cella, Harper & Scinto

[57] ABSTRACT

An image processing apparatus includes an image input device for photoelectrically converting a document image which has been optically read and for inputting the converted document image as image data. An area separator separates a plurality of areas included in the input image data from one another and a character recognition is performed from a plurality of directions with respect to character data in the image data input by the image input device with reference to a character recognition dictionary. The apparatus performs a first discriminating function of discriminating, for the plurality of areas separated by the area separator, respective reliabilities in a plurality of directions on the basis of results of the character recognition, and second discrimination function for discriminating a document direction on the basis of average values of the reliabilities discriminated by the first discriminating function.

23 Claims, 13 Drawing Sheets

本発明の名称 (upside down)

(TITLE OF THE INVENTION)

(TITLE OF THE INVENTION)

| | 0° | 90° | 180° | 270° |
|---|---|---|---|---|
| | 本 (THE) | 本 (THE) | 本 (THE) | 本 (THE) |
| RECOGNITION RESULT | 本~50 (THE) | 町~51 (TOWN) | 克~52 (OVERCOME) | 式~53 (METHOD) |
| RELIABILITY | 0.90 | 0.40 | 0.30 | 0.50 |

FIG. 6A    FIG. 6B    FIG. 6C

| HEADER |
|---|
| RECT 1 |
| RECT 2 |
| RECT 3 |
| RECT 4 |
| ⋮ |
| RECTN 1 |
| RECTN 2 |
| RECTN 3 |
| RECTN 4 |

| HEADER |
|---|
| BLK HEADER |
| OCR 1 |
| BLK HEADER |
| OCR 2 |
| ⋮ |
| BLK HEADER |
| OCR n |

RECT

| ORDER |
|---|
| ATT |
| X1 |
| Y1 |
| W |
| H |
| DIRECTION |
| SELF ID |
| UPPER ID |
| UPPER ATT |
| RESERVE |

RECOGNITION RESULT

| TYPE |
|---|
| CHR 1 |
| CHR 2 |
| CHR 3 |
| CHR 4 |
| CHR 5 |
| X1 |
| Y1 |
| W |
| H |
| RESERVE |

CHARACTER RECOGNITION IN INPUT IMAGES DIVIDED INTO AREAS

BACKGROUND OF THE INVENTION

1. Field of the Invention

The invention relates to image processing method and apparatus for automatically discriminating the direction of a document of an image read by a photoelectric converting device such as a CCD or the like.

2. Related Background Art

Hitherto, in an information processing apparatus, characters are generally recognized from original information (image data) read by an optical reader such as a scanner or the like. However, the character recognition is performed on the assumption that the characters were inputted so as to face the proper direction (namely, the characters are arranged in the proper direction for the scanner), so that the character recognition result exactly differs from the input original.

Figure 10A:
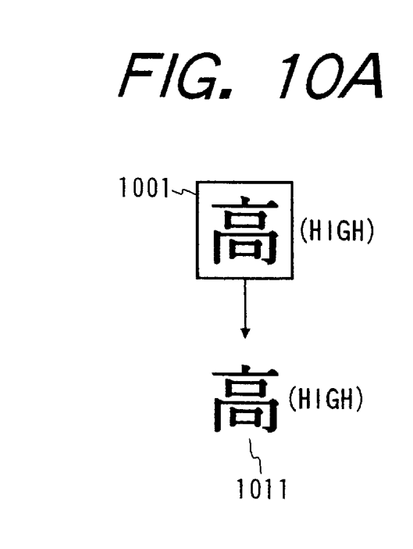
FIGS. 10A to 10D are diagrams showing an example of a character recognition result in each direction for the same character.
Figure 10B:
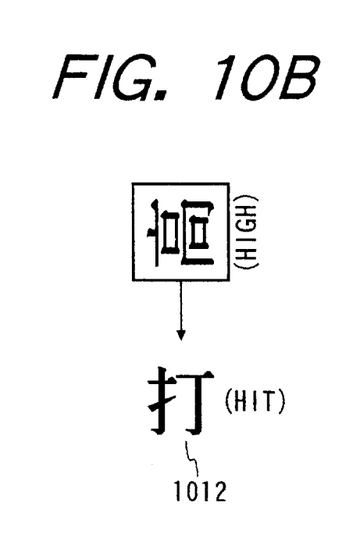
Figure 10C:
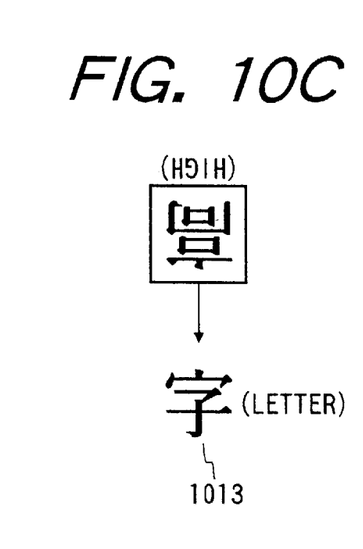
Figure 10D:
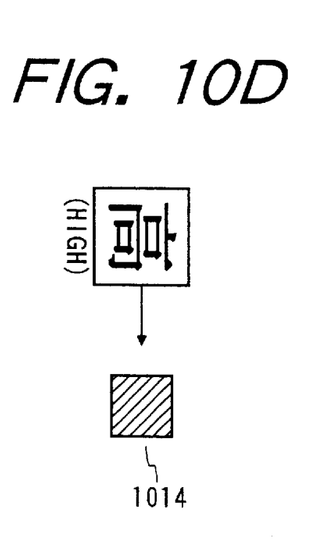

For example, in case of characters 1001 shown in FIGS. 10A to 10D, when an image is inputted so that the character faces the proper direction as shown in FIG. 10A, a recognition result as a character 1011 is correctly obtained. However, in the case where an image is rotated by 270° and is inputted as shown in FIG. 10B, it is erroneously recognized as a character 1012. In the case where image data is rotated by 180° and the image is inputted as shown in FIG. 10C, it is erroneously recognized as a character 1013. In the case where image data is rotated by 90° and the image is inputted as shown in FIG. 10D, it cannot be recognized. Those recognition results are shown for convenience of explanation and the actual results do not always become the results as mentioned above.

In order to avoid the above-mentioned problem that when the input image is character recognized, if the direction of a document is not the proper direction, the correct result cannot be obtained, there is also the following method. Namely, the image inputted by the scanner is displayed and the user judges whether or not the image has been inputted in the proper direction. When the inputting direction is not the proper direction, rotation of the image in an image memory is instructed so as to manually rotate the direction of the image by 90°, 180°, and 270° by the user, thereby rotating the image, or the setting direction of the original to the scanner is changed to the proper direction and the image is again inputted or the like, thereby correcting the image to the proper direction, and after that, the start of the character recognition is instructed.

However, owing to improvements in the processing speed scanners, an automatic document feeding function called an auto feeder is annexed to the apparatus allowing plurality of originals can be automatically read and inputted. The number of originals as targets to be processed can be set to a large quantity of papers. In such a situation, it is very difficult to perform operations for manually judging the proper direction one by one for a plurality of originals and for correcting the direction of the original image.

Figure 11A:
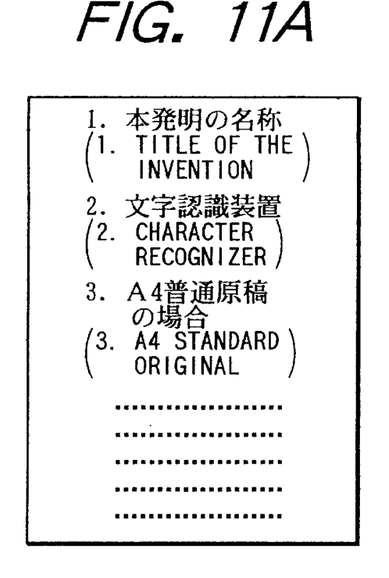
FIGS. 11A to 11D are diagrams showing examples of formats such as a character direction and the like of various kinds of documents.
Figure 11B:
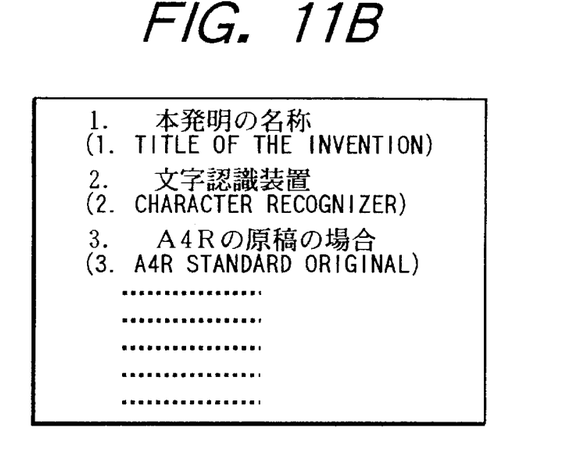
Figure 11C:
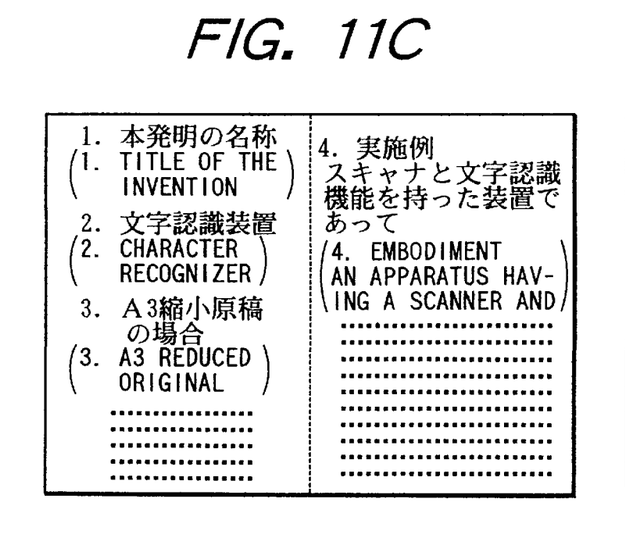
Figure 11D:
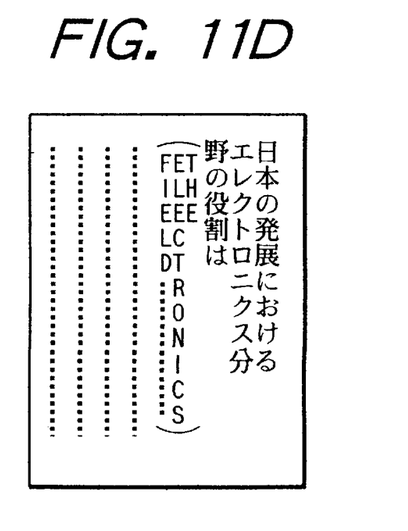

The contents of the document of the original is expressed by various patterns such as vertical writing, lateral writing, and the like. That is, for example, there are various kinds of patterns, such as a document of the A4 size that is vertically placed and is written in the lateral direction (see FIG. 11A: for example, this pattern is often used in a lateral writing Japanese document, English document, or the like), a document of the A4 size which is laterally placed and is written in the lateral direction (see FIG. 11B: for example, such a pattern is frequently used in a document having a long sentence, a document for the OHP, a document in case of reducing and copying a document of the A3 size, B4 size, or the like which is laterally placed, or the like), a document of the A4 size which is laterally placed and is laterally written and in which the column setting is switched at the center (see FIG. 11C: for example, such a pattern is often used in case of continuously reducing and copying two sheets of documents of the A4 size), a document of the A4 size which is vertically placed and is vertically written (see FIG. 11D), and the like.

On the other hand, the direction of an image which is displayed on a display screen is determined by the scanning direction (image reading direction) of the scanner when inputting the image. Therefore, in case of reading the original at a position such that the scanning direction of the scanner coincides with the direction of a character train of the document, the document is displayed at the inherent position.

Figure 12A:
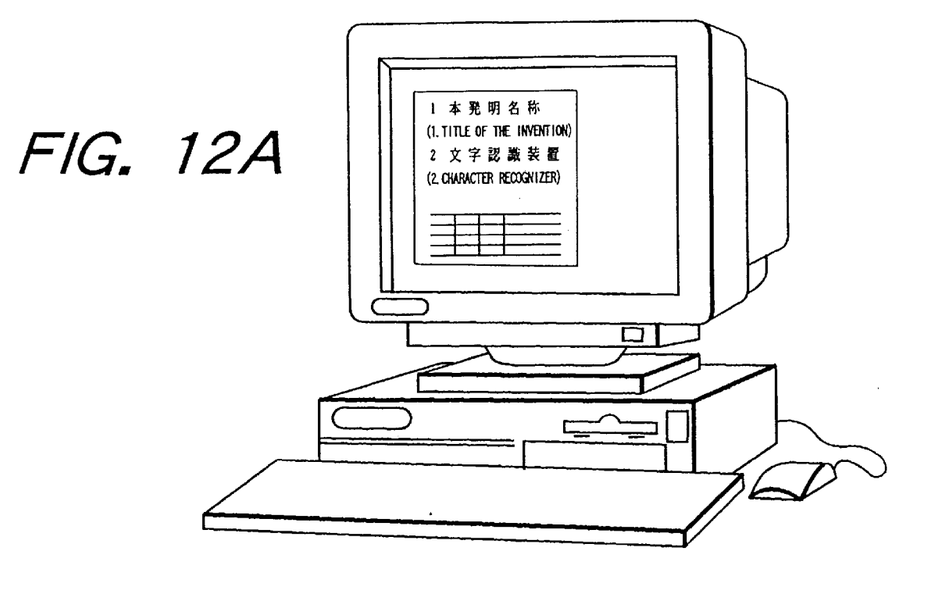
FIGS. 12A and 12B are explanatory diagrams for explaining a problem in case of displaying a document on a monitor.
Figure 12B:
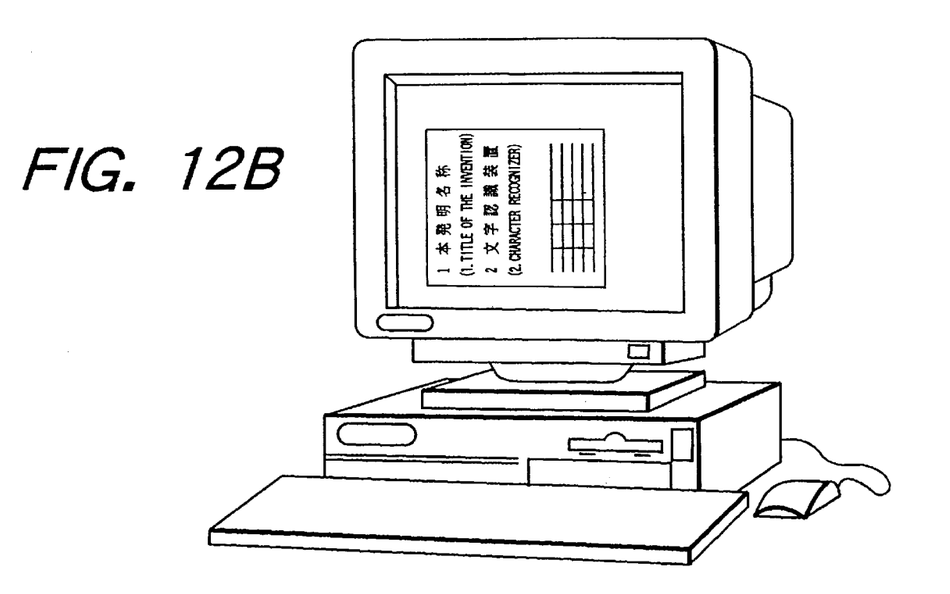

However, in case of the scanner of the A4 size, since the direction of the original is unconditionally determined, the original cannot be read at the position such that the scanning direction of the scanner is made coincide with the direction of the character train of the document and, for example, as shown in FIG. 12B, the document is displayed in a state in which it is rotated by 90° from the inherent position, so that there is a case where it is very difficult to read the image.

Figure 13A:
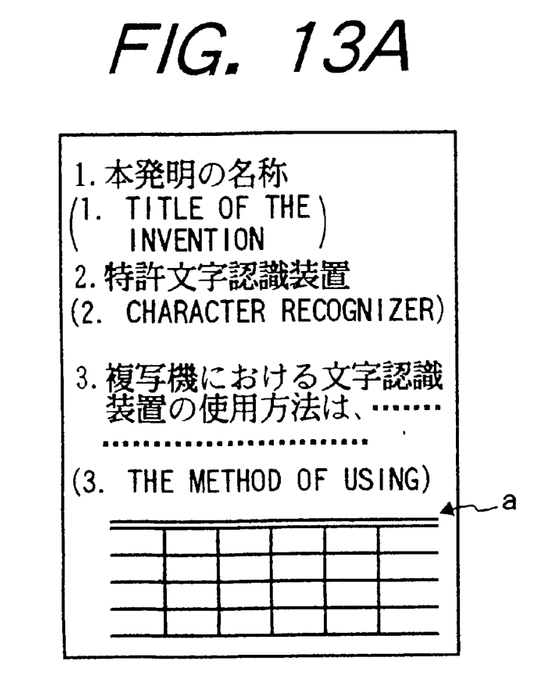
FIGS. 13A and 13B are explanatory diagrams for explaining conventional document direction discriminating methods.
Figure 13B:
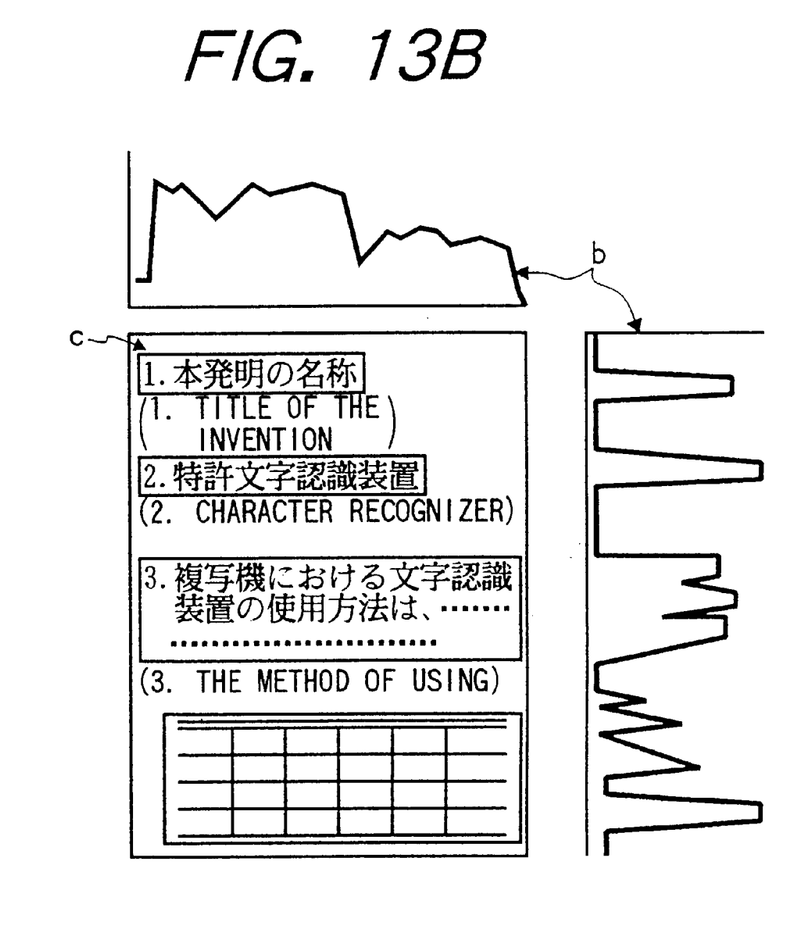

Hitherto, there is a method of automatically discriminating the direction of the inputted original so as to reduce the operation to correct the direction of the original by the operator as mentioned above. Namely, as shown in FIG. 13A, there is a method whereby lines of a table, a separator (a), and the like are extracted from an inputted original image and it is judged that the direction of the lines is the lateral direction. As shown in FIG. 13B, there is a method whereby projections (histograms) in the vertical and lateral directions of a document are detected and the direction is judged by checking a degree of delimiter, or the like. According to the above methods, the direction is fairly arbitrarily decided. According to such methods, it is impossible to cope with documents of many kinds of formats as shown in FIGS. 11A to 11D. For example, a condition such that the separator in the lateral direction exists in the document, the document is laterally written, or the like is needed. For a document that does not satisfy such conditions, the direction of the original cannot be automatically discriminated.

SUMMARY OF THE INVENTION

According to the invention, it is taken in to consideration that a factor which most accurately expresses the direction of a document is a character, with respect to a plurality of characters among a plurality of character areas for inputted document image data, a character recognition is performed from four directions of 0°, 90°, 180°, and 270°, an average value of precision values (reliabilities) of the character recognition per direction of a plurality of characters is obtained for every character area, a mean value in the whole character area of the average value per direction in each character area obtained is calculated, and the direction in which the mean value is largest is discriminated as a document direction, so that the direction of the document can automatically be judged at a high precision.

By using such a method, the direction of the document can automatically be discriminated at a high precision irrespective of the format of the document.

According to the invention, in the case where the document is not placed in the proper direction, by correcting the direction of the document by rotating the image information in accordance with the information in the proper direction which was automatically judged, a burden of the operation of the operator is eliminated and the image inputting operations at least up to the character recognition stage can be automated.

According to the invention, by automatically judging the direction of the original and performing the character recognition in the proper direction, a high recognition ratio can be obtained.

DETAILED DESCRIPTION OF THE PREFERRED EMBODIMENTS

Embodiments of the present invention will now be described in detail hereinbelow with reference to the drawings.

Figure 1:
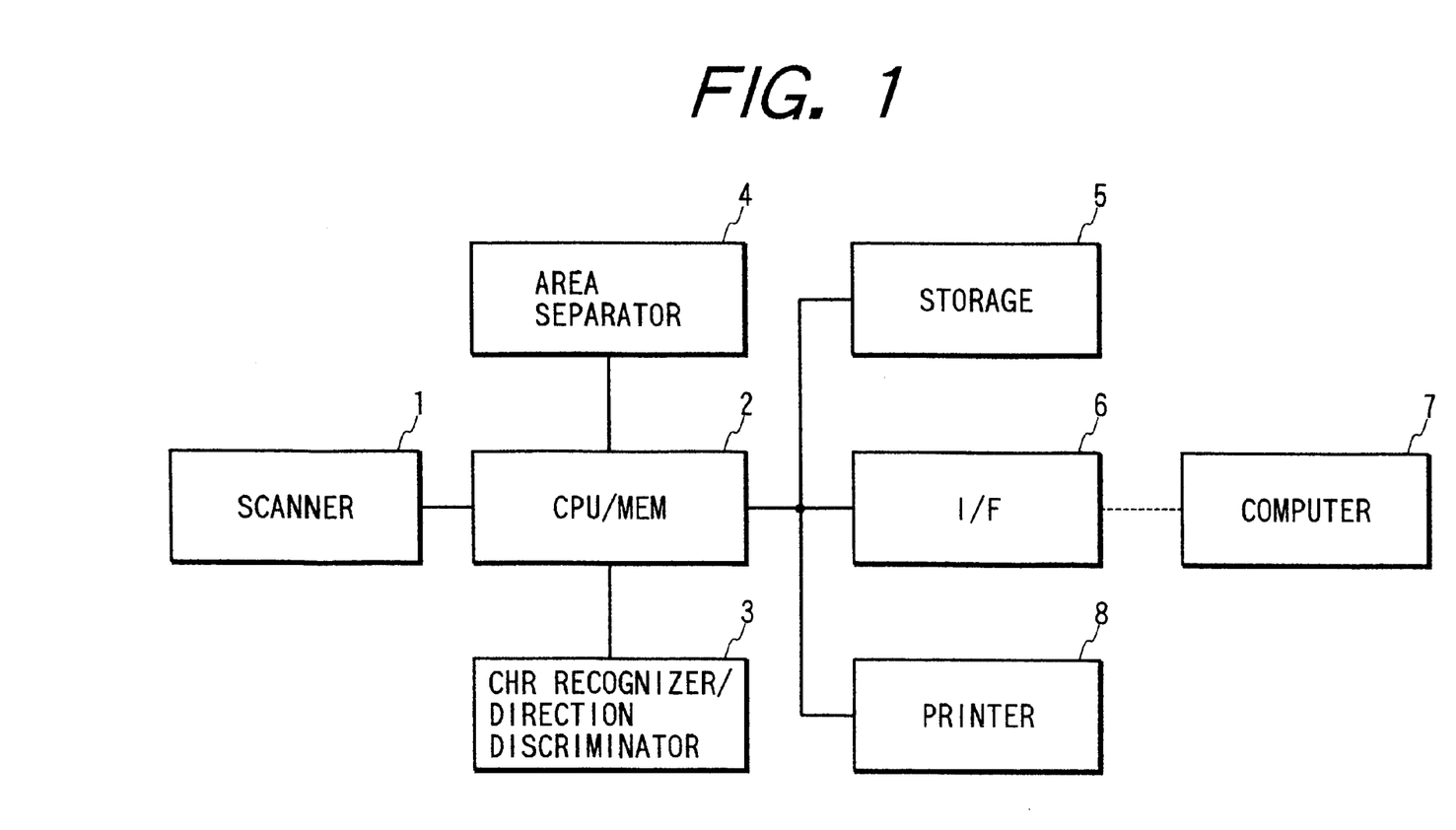
FIG. 1 is a system constructional diagram of a data processing system to which a document direction automatic discriminating apparatus and a document direction automatic correcting apparatus according to an embodiment of the invention are applied.

FIG. 1 is a system constructional diagram of a data processing system to which a document direction automatic discriminating apparatus and a document direction automatic correcting apparatus according to the embodiment of the invention are applied. The system has an image input unit and an image processing unit and is realized using either one of a scanner, a copying apparatus, an intelligent input device and a sole input device which is connected to a computer through an interface to be made intelligent.

A scanner 1 is means for optically reading a document original and photoelectrically converting and inputting as digital image data. By attaching an auto feeder to the scanner 1, a plurality of originals can be continuously inputted. A CPU/memory 2 is provided for executing various kinds of controls and temporarily storing image data.

By taken into consideration the fact that a factor which most accurately expresses the direction of a document is a character, a character recognizer/direction discriminator 3 performs a character recognition to several kinds of character areas in the document from the directions of 0°, 90°, 180°, and 270° and sets the direction in which the precision is highest among the precisions of the character recognition in the respective directions (reliabilities of the character recognition: distances for a feature distribution of a character) to the document direction.

An area separator 4 is a block to execute processes for separating a character area, a figure area, a natural image area, a table area, and the like into rectangular areas from the document image data and adding an attribute (character area or the like) of each area as a pre-process for performing the character recognizing and direction discriminating processes by the character recognizer/direction discriminator 3.

A storage 5 is constructed by, for example, a hard disk, a magnetooptic disk, or the like and is used to preserve various processing results (image data, area separation result, character recognition result, etc.). An interface (I/F) 6 is constructed by an SCSI, an RS232C, or the like and is provided to transmit data to the outside. A computer 7 obtains and uses information through the I/F 6 or data from a movable storage such as a magnetooptic disk or the like. For the image data inputted from the scanner 1, a printer 8 prints and outputs image data or the like which was subjected to various kinds of processes on the basis of area separation information and character recognition information.

An outline of the processes for the document direction automatic discrimination and correction and the character recognition in the embodiment will now be described in accordance with a flowchart of FIG. 2.

The image data (binary image or multi-level image) which was inputted by the scanner 1 and stored in the memory 2 is first separated into rectangular areas by the area separator 4 for every attribute such as character area, figure area, natural image area, table area, etc. (steps S1, S2). In this instance, area information surrounded by a rectangle is actually formed. The area information is stored into the memory 2 by making coordinate data indicative of the area and attribute (character, figure, natural image, table, etc.) information of the area correspond to each other.

Subsequently, the area information in which the attribute information indicative of the character area among the attributes is made to correspond is extracted from the memory 2 (step S3). The character area relates to a sentence area, a title area, a character in a table, a caption area of a diagram, or the like and is an image area including at least one character pattern. For example, in case of documents shown in FIGS. 3A and 3C, rectangle information of character areas as shown in FIGS. 3B and 3D is discriminated in step S2 and is extracted in step S3. The document direction is judged by using a few blocks in those rectangle information (step S4). Thus, when the document direction is the proper direction, the character recognizing process is also subsequently executed to the other character areas in the images stored in the memory 2 (step S7).

On the other hand, when the document direction is the improper direction, a correction to rotate the image data in the correct direction is executed (step S5). The area separating process similar to step S2 is executed to the rotated image and a process such that the area separation information which was extracted from the image before the direction is corrected and which has already been stored in the memory 2 is corrected to the area separation information extracted from the image whose direction was corrected is executed (step S6). In this process, a difference between the area separation information in association with the image rotation is corrected. As such a correcting method, there is a method of again executing the area separating process to the rotated image data obtained in step S5. There is also another method of performing an address conversion to the area separation information obtained in step S2 and stored in the memory 2. Since the area separating process generally assumes that an image as a target to be processed is placed in the proper direction, in many cases, the result of the area separating process which was performed at the initial stage and the result of the area separating process which was executed for the rotated image data are different. It is, accordingly, desirable to use the former method.

The processing routine advances to step S7 and a character area block in the rotated image data is subjected to the character recognition by the character recognition processing system. Thus, the area separation information and character recognition information are finally obtained with respect to both cases where there is no rotation and where there is a rotation (step S8).

The processing result is transmitted to the computer 7 through the I/F 6. A text of the character recognition result is displayed by a display unit of the computer and is used for an application software or the like of the filing on the computer 7. In the system to transfer the processing result to the storage 5, the result is used for a method which is used like batch processing such that the image information is continuously inputted and the information is subsequently read out in a batch. Further, in the system to transfer the processing result to the printer 8, so long as the printer 8 has a function to interpret a page description language, the processing result is used when a document is reconstructed or a fair copy is made by an inverse PDL (method of forming a page description language by the image data) by the character recognizing process and area separating process.

In the case where a plurality of images are inputted in a batch, the document direction is discriminated with respect to each document, the document direction is stored into the memory 2 in correspondence to the page ID information of the image, and the image of each document can be also subjected to the character recognition in accordance with the page ID information in step S8.

A method of discriminating the document direction by using the character recognizing process will now be described.

Area Separating Process

The area separating process which is executed by the area separator 4 in step S2 will now be described.

Black pixels of the document image data stored in the memory 2 are detected, the area in which the black pixels exist is extracted by an outline tracing or labelling method, and area information as a group of images is formed. Subsequently, a black pixel density in the rectangular area, the presence or absence of the adjacent rectangular block, a ratio between the vertical and lateral dimensions of the rectangle, or the like is used as a judgment reference, thereby discriminating the attribute of the image such as character area (title, body, caption, etc.), figure area, natural image area, table area, or the like with respect to each image area.

Character Recognizing Process

The character recognizing process which is executed by the character recognizer 3 for the document direction discriminating process (S4) and the conversion of the image into the text (S7) will now be described.

Figure 4A:
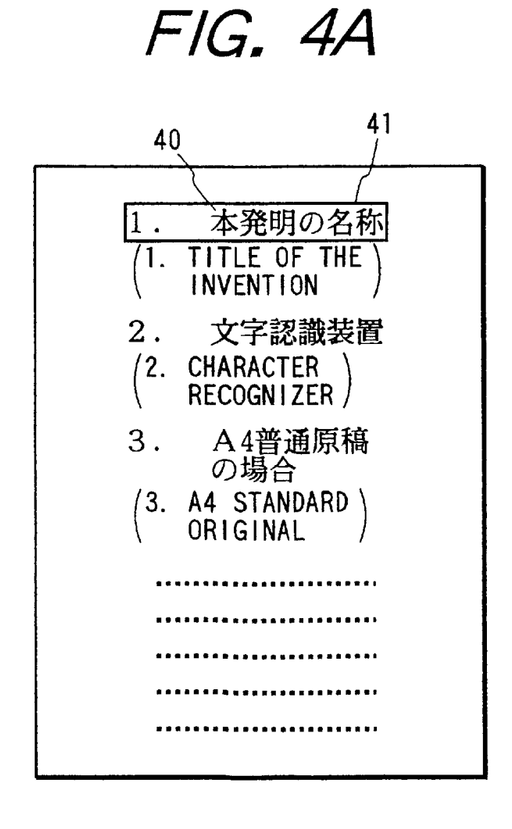
FIGS. 4A to 4D are explanatory diagrams for explaining processing steps of the character recognizing process.
Figure 4B:
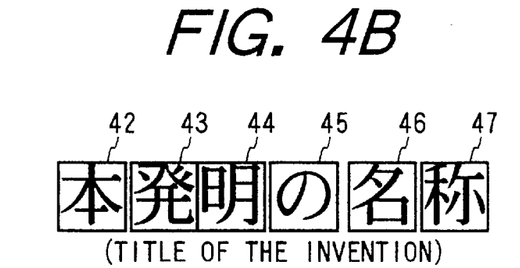
Figure 4C:
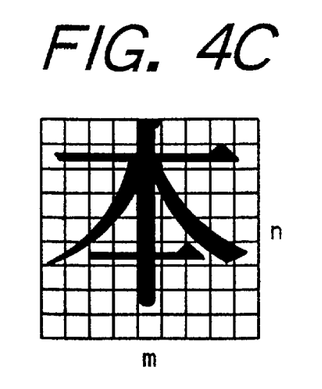

As a method for the character recognizing process, there is a feature vector extracting and comparing method. For example, as shown in FIG. 4A, it is now assumed that a character area 41 including a character 40 was discriminated by the area separating process and was specified as a target of the character recognizing process. As a first stage, a character extracting process is executed with respect to the character area 41 (refer to FIG. 4B). The character extracting process is a process to extract a rectangle of one character and the rectangle is obtained by detecting a state of continuity of the black pixels or by getting a histogram. According to the process at the first stage, total six character patterns of characters 42 to 47 are extracted from the character area 41. As a second stage, one character is divided into (m×n) [for example, 64×64] pixel blocks and those blocks are extracted (refer to FIG. 4C). The distribution direction of the black pixels is extracted (direction vector information: refer to FIG. 4D) by using a window of (3×3) pixels among them.

Figure 4D:
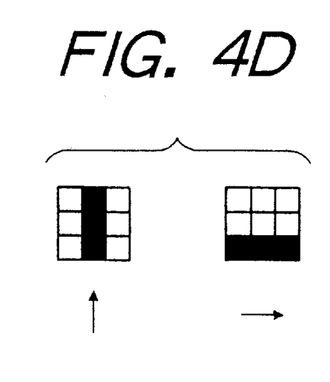

FIG. 4D shows an example of a part of the direction vector information. By shifting the window of (3×3) pixels, tens of direction vector information are obtained. The feature vector information becomes a feature of the input character. Vector information similar to it has been also stored as standard data in a character recognition dictionary. The feature vector extracted from the input character and the contents of the character recognition dictionary which has previously been stored are compared. Candidate characters are sequentially extracted from the dictionary in accordance with the order from the character whose feature is closest to the feature vector extracted from the input character. In this case, the first candidate, second candidate, third candidate, and so on are extracted in accordance with the order from the characters whose features are close to the feature vector. A similarity indicative of a closeness of the feature to the feature vector, namely, closeness of the distance to the character becomes a numerical value called a reliability (precision) of the result of the character recognition.

Character Direction Discriminating Process

In this way, the reliability of the result of each character recognition is obtained. Each character direction discriminating process based on the reliability will now be described with respect to an example in case of performing the character direction discriminating process as for the character area 41 shown in FIG. 5A.

Figure 5A:
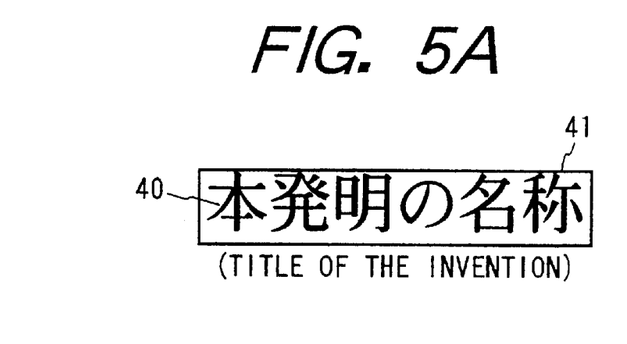
FIGS. 5A to 5C are explanatory diagrams for explaining the document (character) direction discriminating process.

First, explanation will now be made with respect to processes such that the character 40 as a first character in the character area 41 is recognized in four directions and the direction of the character pattern 40 of the first character is discriminated from the reliability of the character recognition result derived in each direction.

Figure 5B:
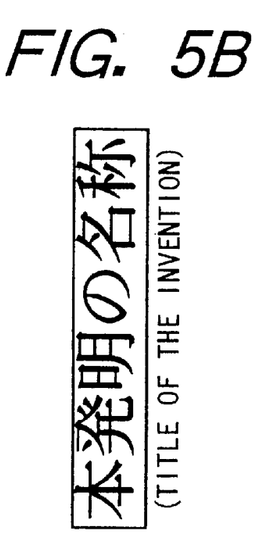
Figure 5C:
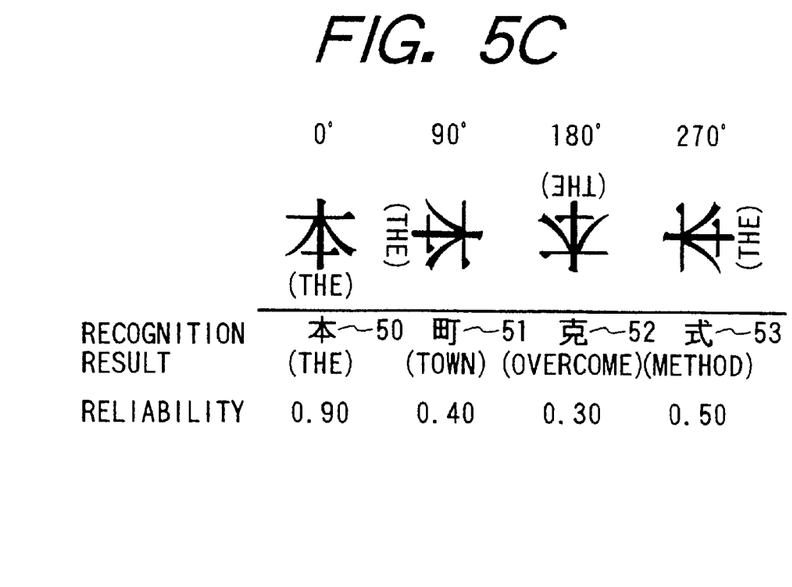

FIG. 5A shows a sentence in the proper direction. FIG. 5B shows a sentence rotated by 270°. Attention is now paid to the character pattern 40 of the first character which is first extracted from the character area. In case of discriminating the character direction, as shown in FIG. 5C, the character recognition is executed with respect to one character 40 from four directions of 0°, 90°, 180°, and 270°, respectively. It is sufficient to set each rotational angle by changing a reading method of the image of the character rectangle from the memory 2 when the character recognition is performed. There is no need to particularly rotate the original.

As shown in FIG. 5C, the character recognition results at the respective rotational angles are different from each other. The temporary character recognition results and reliabilities for explanation are shown in FIG. 5C and the actual results and reliabilities do not always coincide them.

In FIG. 5C, when the character recognition is executed from 0°, the image is correctly recognized as a character 50 and the reliability is also equal to a high value of 0.90. In case of performing the character recognition from the direction rotated by 90°, the image is erroneously recognized as a character 51 and the reliability also decreases to 0.40. The reason why the erroneous recognition occurs and the reliability also deteriorates is because the character recognition is performed on the basis of the feature vector in case of seeing from the rotated direction. Similarly, when the character recognition is executed from the rotated directions of 180° and 270° as well, the erroneous recognition occurs and the reliability deteriorates. As the character is complicated, the difference between the reliabilities for the directions of the character recognition typically appears.

As for the result of FIG. 5C, since the reliability of 0° is the highest, it is judged that a possibility such that the document faces in the proper direction is high. To further improve the precision of the discrimination about the character direction, the character recognition is similarly executed from four directions with respect to a plurality of characters in the same block. For example, in case of the character area 41 shown in FIG. 4A, the character recognition is performed from four directions with respect to each character of not only the character 42 but also the characters 43 to 47. Further, in the case where the character direction is judged in only one block, since there is a possibility such that the character direction is erroneously judged with respect to a special character train, a similar character recognition can be also executed with respect to a plurality of blocks.

It is also possible to construct in a manner such that with regard to each block, the average values of the reliabilities for every four directions of each of the recognition target characters in the relevant block are obtained, the direction in which the highest average value among them is derived is judged as a character direction of the block, and such a direction is decided as a document direction of the input image. Further, the character pattern of the character direction discrimination is selected from a plurality of character areas, the mean values for the average values of the reliabilities for every four directions in each block is obtained, and the direction in which the mean value is the highest among them is recognized as a character direction (document direction).

As mentioned above, by recognizing the character direction on the basis of a plurality of characters in the same block and, further, on the basis of the reliabilities of a plurality of characters in the same block without recognizing the character direction by the reliability of only one character, the character (document) direction can be discriminated at a high precision. It will be obviously understood that even if the character direction is discriminated by the reliability of only one character or is judged by the reliabilities of a plurality of characters in the same block, the character direction can be discriminated at a higher precision than the conventional one.

When the discrimination result of the character direction (document direction) indicates the direction other than the proper direction, the original image stored in the memory 2 is rotated so that the character direction is set to the proper direction. The rotation can be easily executed by the well-known technique by using the CPU/memory 2 in FIG. 1 and its description is omitted here.

Figure 6A:
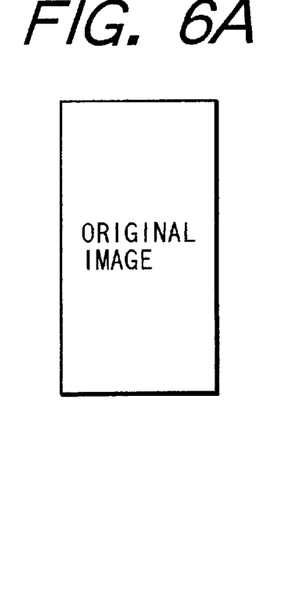
FIGS. 6A to 6C are diagrams showing data formats of area separation and character recognition information.
Figure 6B:
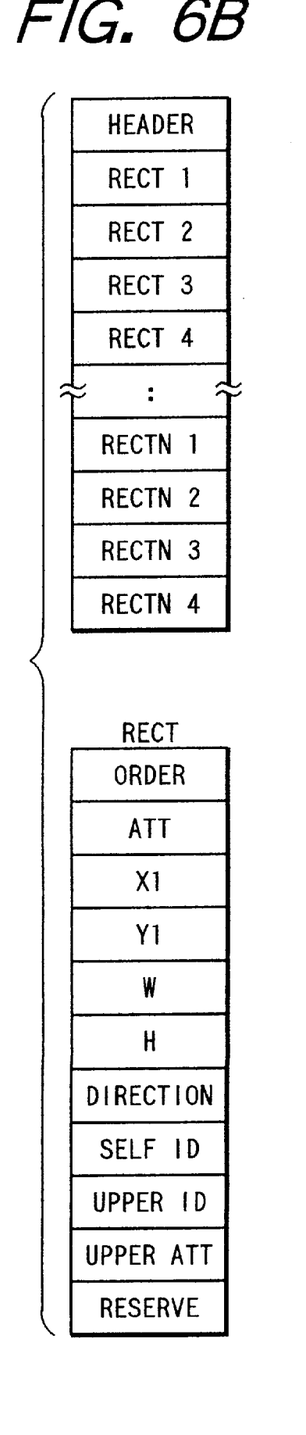
Figure 6C:
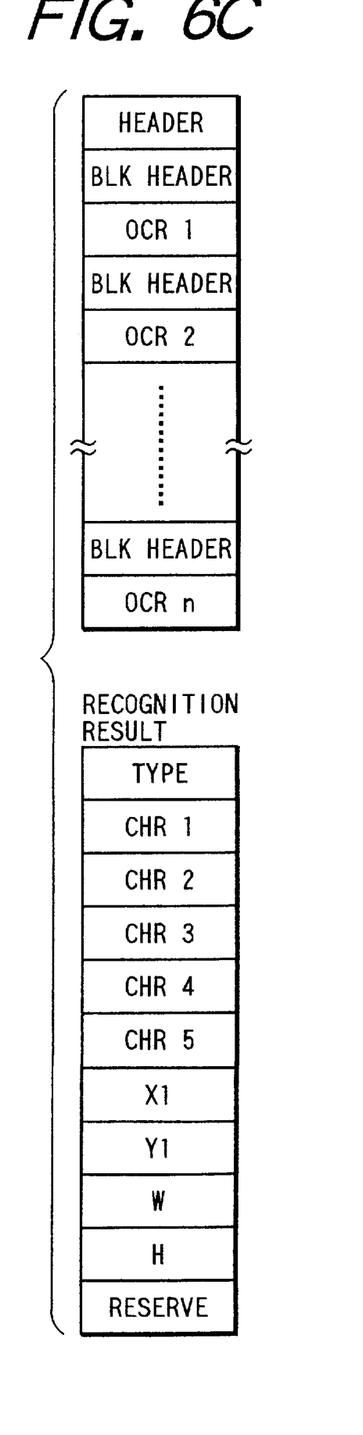

By the processes as mentioned above, original image data shown in FIG. 6A, area separation data shown in FIG. 6B, and character recognition information shown in FIG. 6C can be obtained. Those information is used by an application such as electronic filing, document modification, DTP, or the like as mentioned above.

A format of the area separation data which is obtained by the area process in step S2 and is stored in the memory 2 is constructed by "header" indicative of the area separation data and identifiers "rect1" to "rect4" of the separated areas as shown in FIG. 6B. Information of each area (block) classified by those identifiers is constructed by: a number "order" of the block; an attribute (character area, figure area, etc.) "att" of the block; coordinate values "x1" and "y1" at the left upper position of the block; a width "w" of the block; a height "h" of the block; "direction" indicating that the document is written in the vertical or lateral direction; "SelfID" as an ID of the relevant block; "upperID" as an ID of a master block including the relevant block; an attribute "upperAtt" of the master block; and a reserved area "reserve".

As shown in FIG. 6C, the character recognition information has "header" indicative of the character recognition information and is constructed by combination information of character recognition information "OCR1" or the like regarding a single character such as "character 40" or the like and "blk header" corresponding to the above identifier "rect1" or the like indicative of the block including the relevant character.

Each character recognition information such as "OCR1" or the like is constructed by: "type" indicative of a character or a blank; first to fifth candidate characters "character1" to "character5" according to the reliability of the character recognition mentioned above; extracting positions "x1" and "y1" of the character; a width "w" of the character; a height "h" of the character; and a reserved area "reserve".

According to the embodiment, in the case where the document does not face the proper direction as a result of the discrimination of the document direction and the image has to be rotated, the whole original image data is rotated and the character recognition is executed. However, the character recognition can be also performed without rotating the original image data.

Figure 7:
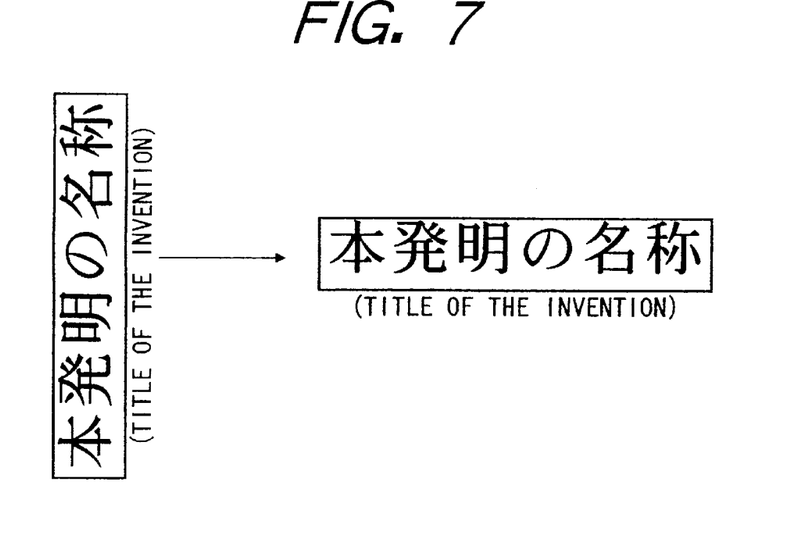
FIG. 7 is an explanatory diagram for explaining another embodiment.

In this case, when the rectangle information of the character area is obtained, as shown in FIG. 7, it is sufficient that only the character rectangle data is rotated and copied into another memory and the character recognition is executed for the rectangle image data.

Figure 8:
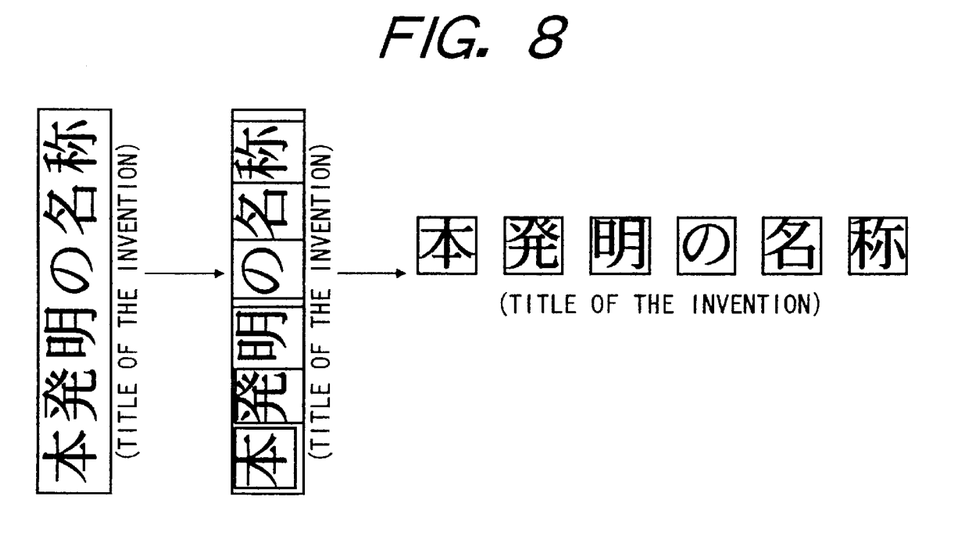
FIG. 8 is an explanatory diagram for explaining another embodiment different from FIG. 7.
Figure 9:
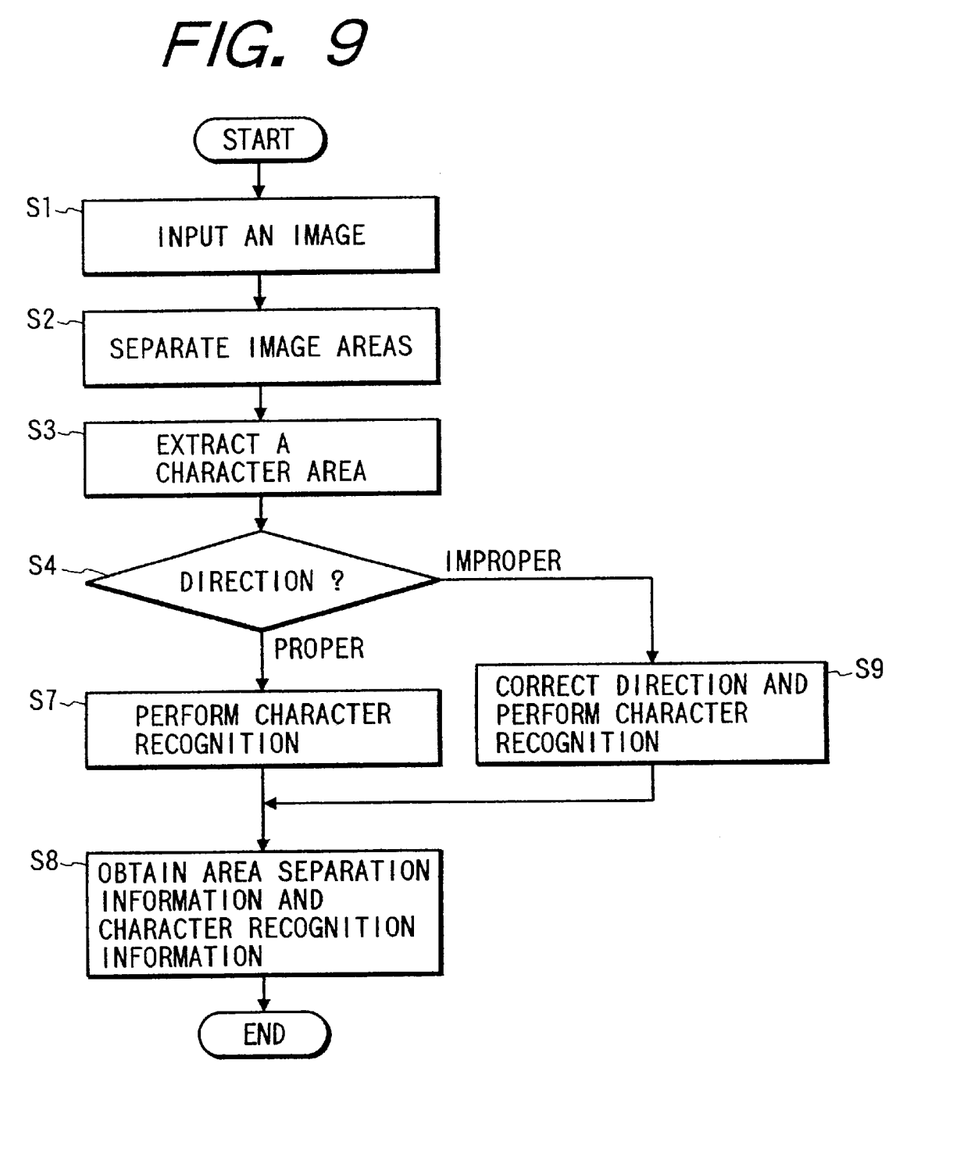
FIG. 9 is a flowchart showing processes for automatic discrimination and correction of a document direction and character recognition according to another embodiment of FIG. 8.

As shown in FIG. 8, it is also possible that a character extraction is executed for the character rectangular area without rotating the image data and when each character is read out, it is read out in a state in which the reading direction is rotated, and the character recognition is performed (refer to step S9 in FIG. 9). Since the other steps in a flowchart of FIG. 9 are almost similar to those mentioned in FIG. 1, they are designated by the same step numbers and their descriptions are omitted here.

Figure 2:
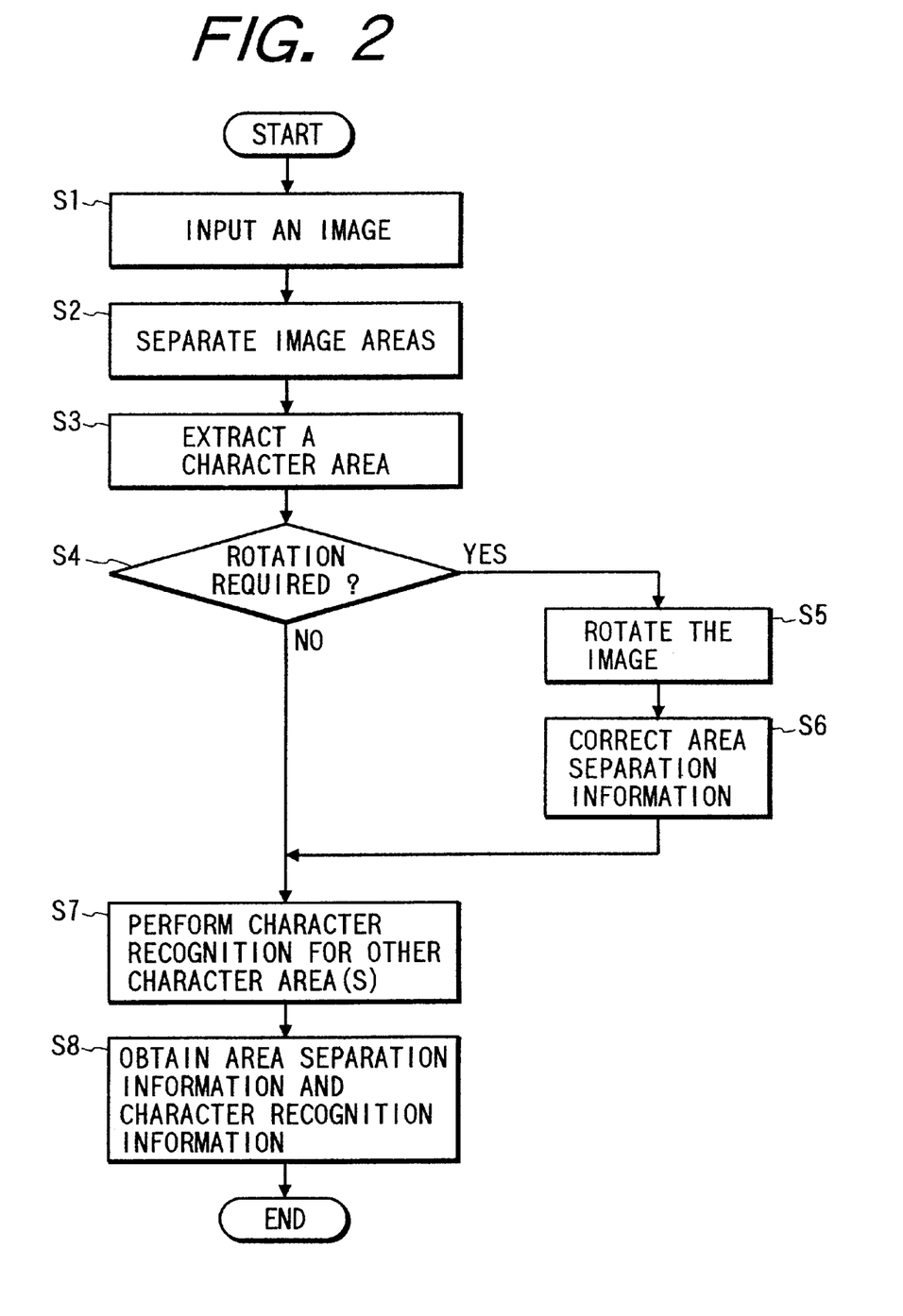
FIG. 2 is a flowchart showing processes for automatic discrimination and correction of a document direction and character recognition according to the embodiment of the invention.
Figure 3A:
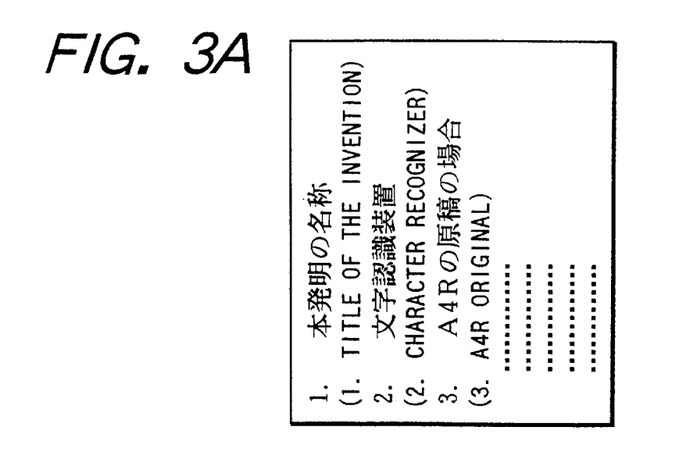
FIGS. 3A to 3D are diagrams showing area separation states.
Figure 3B:
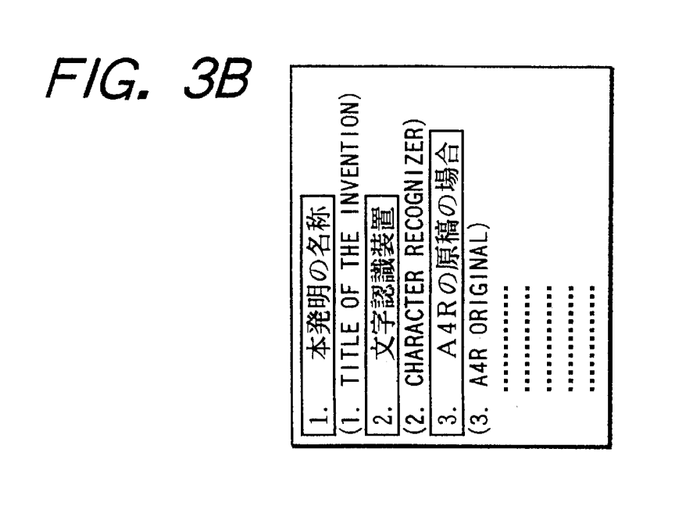
Figure 3C:
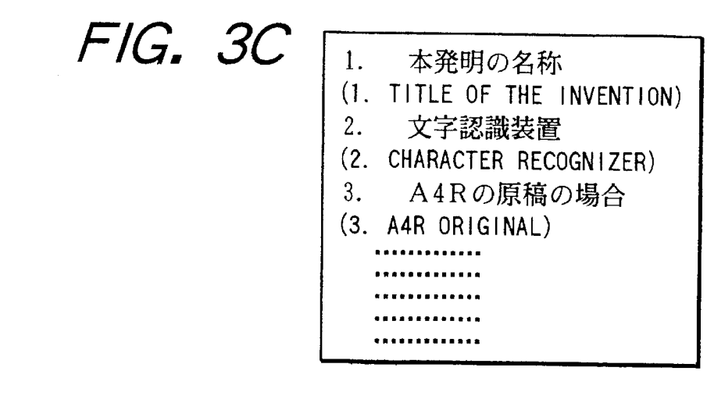
Figure 3D:
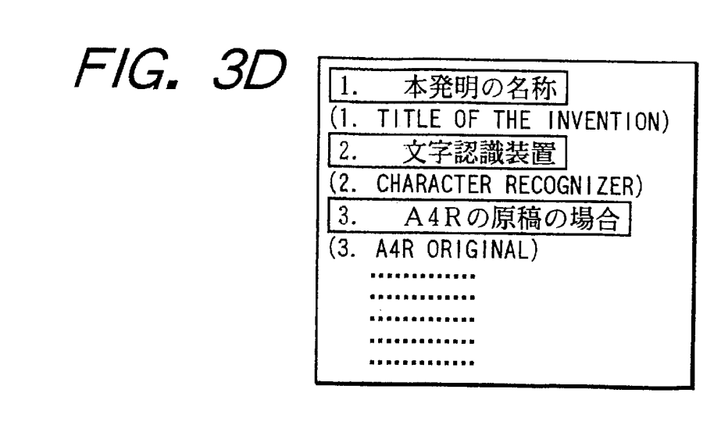

In the flowchart of FIG. 2, all of the processes from the input of the image to the process to form the text of the image data by the character recognition have been described as a series of processes. However, the image data in which it is judged that the document direction is the proper direction as a result of the discrimination of the document direction in S4 and the image data as a result in which the image was rotated (S5) and corrected to the proper direction are outputted by display means (not shown) or the printer 8. Thus, the user can automatically obtain the image data in the proper direction and the subsequent working efficiency can be raised.

The invention is not limited to each of the above embodiments but can be also applied to, for example, documents written in other languages instead of Japanese. Particularly, in case of a document written in English or the like, since such a document would not be written vertically, the document direction can be discriminated at a higher precision.

The document direction discriminating process in the case where the original as a target of the judgment about the document direction is written in English will now be described with reference to FIGS. 14A, 14B, and 15A to 15C.

Figure 14A:
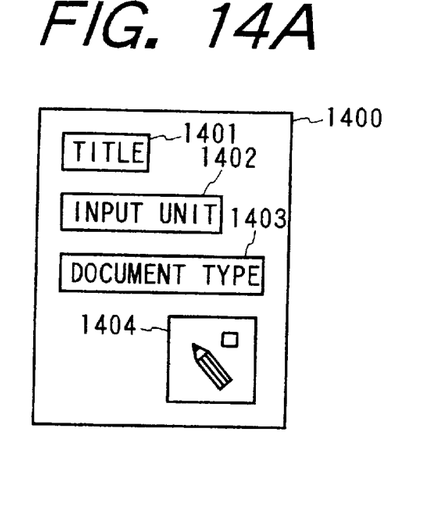
FIGS. 14A and 14B are diagrams for explaining a character extraction of an English document.

An image 1400 inputted in S1 is stored into the memory 2 and four image areas 1401 to 1404 are extracted by the area separator 4 (S2). It is judged that three areas 1401 to 1403 among the extracted image areas are character areas and one area 1404 is a figure area from the feature of the image.

In the detection of the character area in S3, the area information of the three image areas 1401 to 1403 which were judged as character areas in S2 is read out from the memory 2 and the process to discriminate the document direction from the image data of each area is executed (S3).

Figure 14B:
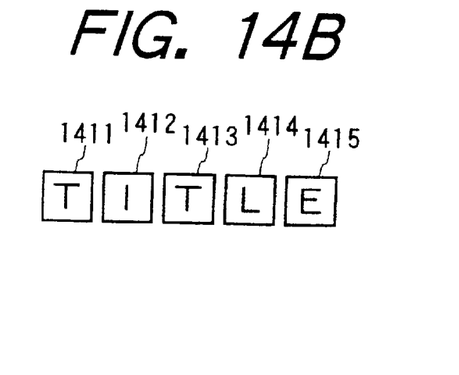
Figure 15A:
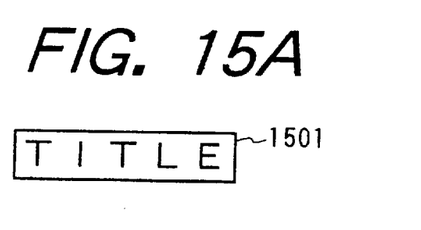
FIGS. 15A to 15C are diagrams showing results in the case where a character "T" is recognized in four directions.
Figure 15B:
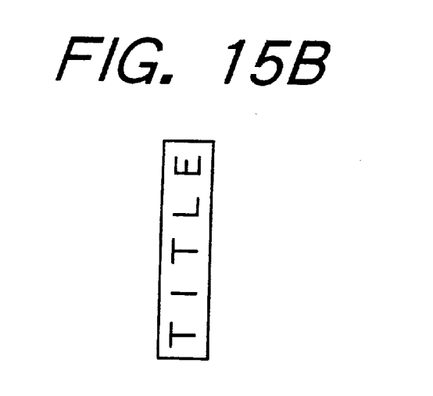
Figure 15C:
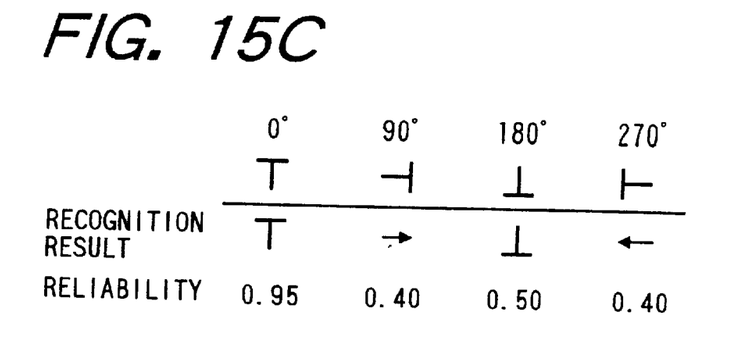

For example, when the character patterns are extracted from the image data in the character area 1401, five characters 1411 to 1415 are extracted as shown in FIG. 14B. Among them, the results obtained by recognizing the first character "T" from four directions are as shown in FIG. 15C. Correctly, when the character 1411 of "T" is recognized from 0°, the result such that the recognized character (first candidate character) is "T" and the reliability is equal to 0.95 is obtained. When the character 1411 is recognized from 90°, the result such that the recognized character is "→" and the reliability is equal to 0.40 is obtained. Similarly, in case of 180°, the recognized character is "1" and the reliability is equal to 0.50. In case of 270°, the recognized character is "←" and the reliability is equal to 0.40.

From the above results, the recognized character "T" with the highest reliability corresponds to the correct recognition result of the character 1411. The rotational angle 0° at which the correct recognition result is obtained is judged to be the direction of the character 1411.

It is also possible to discriminate that the direction judged here is set to the document direction of the image 1400.

Or, in order to discriminate the document direction at a higher precision, it is also possible to construct in a manner such that the character recognition is performed with respect to all of the characters 1411 to 1415 included in the character area 1401 selected from all of the character areas (1401 to 1403) extracted in step S2 and the average value of the reliabilities is obtained in each direction and the direction in which the average value is the highest among them is judged as a direction of the document. It is also possible to selectively perform the character recognition to, for example, only the first and fifth characters in accordance with a predetermined order instead of executing the character recognition with regard to all of the characters 1411 to 1415. In this case, the characters "T" and "E" are recognized.

Or, in order to discriminate the document direction at a further high precision, it is also possible to select and recognize the characters from all of the character areas extracted in S2 and to discriminate the document direction by using the recognition results. In this case, there is used a method whereby the average value of the reliabilities of all of the recognition results is obtained for each direction and the direction in which the average value is the largest among them is discriminated as a document direction. Or, there is used a method whereby the average value of the reliabilities for each direction is obtained every area and the mean value obtained of the average values of each area is obtained with respect to all of the areas and the direction in which the mean value is the highest among them is discriminated as a document direction.

The characters to be recognized can be selected at random or can be sequentially selected in accordance with a predetermined order as mentioned above. For example, now assuming that the first and fifth characters are selected in a manner similar to the above, "T" and "E" are selected from the character area 1401, "I" and "T" are selected from the character area 1402, and "D" and "M" are selected from the character area 1403. The document direction of the image 1400 is discriminated in accordance with the results of the character recognition of those six characters.

In case of English, since only the documents written in the lateral direction exist, the direction in which the image in the character area extracted by the area separating process is placed laterally assumes 0° in accordance with the shape of the extracted character area. Since the documents of 90° and 270° cannot exist, the character recognizing process is omitted. The character recognition is performed with respect to only 0° and 180° and the document direction can be judged by checking which reliability is higher.

Since the character recognizing process can be reduced by the above processing procedure, the processing time for document discrimination can be reduced.

What is claimed is:

1. An image processing apparatus comprising:

image input means for photoelectrically converting a document image which has been optically read and for inputting the converted document image as image data;

area separation means for separating a plurality of areas included in the input image data from one another;

recognition means for performing a character recognition from a plurality of directions with respect to character data in the image data input by said image input means with reference to a character recognition dictionary;

first discriminating means for discriminating directional reliabilities of each of the plurality of areas, based on results of the character recognition per direction of a plurality of characters extracted from each area;

second discriminating means for discriminating a directional reliability for an entire area of the input image data, based on the discriminated directional reliabilities for each area; and third discriminating means for discriminating a document direction based on the directional reliability for the entire area.

2. An apparatus according to claim 1, wherein said recognition means performs the character recognition from a plurality of directions with respect to the character data in said input image data with reference to the character recognition dictionary.

3. An apparatus according to claim 1, wherein said recognition means extracts a character area including a plurality of patterns from said input image data and performs the character recognition from a plurality of directions with respect to each of the plurality of character patterns in said extracted character area.

4. An apparatus according to claim 1, further comprising control means for controlling said recognition means to perform the character recognition with respect to a character image in the image data corrected in accordance with the document direction discriminated by said third discriminating means.

5. An apparatus according to claim 1, wherein said image input means is a scanner.

6. An apparatus according to claim 1, wherein said image input means inputs a plurality of document images, and wherein said third discriminating means discriminates the document direction with respect to each of the plurality of document images input by said image input means.

7. An apparatus according to claim 1, wherein said recognition means selectively performs the character recognition with respect to data included in at least one of the plurality of areas separated by said area separation means, in which area at least one character data is located.

8. An apparatus according to claim 1, further comprising correction means for correcting the image data input by said image input means in accordance with the document direction discriminated by said third discrimination means.

9. An apparatus according to claim 8, wherein said correction means corrects the input image data by rotating the image data.

10. An image processing method comprising:
 a step of photoelectrically converting a document image which has been optically read and inputting the converted document image as image data;
 a step of separating a plurality areas included in the input image data from one another;
 a step of performing a character recognition from a plurality of directions with respect to character data in the input image data with reference to a character recognition dictionary in which features of characters have been stored;
 a first discriminating step of discriminating directional reliabilities based on results of the character recognition per direction of a plurality of characters extracted from each area;
 a second discriminating step of discriminating a directional reliability for an entire area of the input image data, based on the discriminated directional reliabilities for each area; and
 a third discriminating step of discriminating a document direction based on the directional reliability for the entire area.

11. A method according to claim 10, wherein said character recognition step performs the character recognition with respect to a character image in the image data corrected in accordance with the document direction discriminated at said third discriminating step.

12. A method according to claim 10, wherein the image data is input by a scanner.

13. A method according to claim 10, wherein image data of a plurality of documents is input at said photoelectrically converting step, and said third discriminating step discriminates the document direction with respect to each of the input document images.

14. A method according to claim 10, wherein at said character recognition step the character recognition is selectively performed with respect to data included in at least one of the plurality of areas separated at said separating step, in which area at least one character data is located.

15. A method according to claim 10, further comprising a correction step of correcting the input image data in accordance with the document direction discriminated at said third discriminating step.

16. A method according to claim 15, wherein said correction step corrects the input image data by rotating the image data.

17. A computer-readable medium storing instructions executable by a processor-controlled image processing apparatus, said instructions causing the apparatus to perform the following steps:
 a step of photoelectrically converting a document image which has been optically read and inputting the converted document image as image data;
 a step of separating a plurality areas included in the input image data from one another;
 a step of performing a character recognition from a plurality of directions with respect to character data in the input image data with reference to a character recognition dictionary in which features of characters have been stored;
 a first discriminating step of discriminating, directional reliabilities of each of the plurality of areas based on results of the character recognition per direction of a plurality of characters extracted from each area;
 a second discriminating step of discriminating a directional reliability for an entire area of the input image data, based on the discriminated directional reliabilities for each area; and
 a third discriminating step of discriminating a document direction based on the directional reliability for the entire area.

18. A computer-readable medium according to claim 17, wherein said character recognition step performs the character recognition with respect to a character image in the image data corrected in accordance with the document direction discriminated at said third discriminating step.

19. A computer-readable medium according to claim 17, wherein the image data is input by a scanner.

20. A computer-readable medium according to claim 17, wherein image data of a plurality of documents is input at said photoelectrically converting step, and said third discriminating step discriminates the document direction with respect to each of the input document images.

21. A computer-readable medium according to claim 17, wherein at said character recognition step the character recognition is selectively performed with respect to data included in at least one of the plurality of areas separated at said separating step, in which area at least one character data is located.

22. A computer-readable medium according to claim 17, said instructions further causing the apparatus to perform a correction step of correcting the input image data in accordance with the document direction discriminated at said third discriminating step.

23. A computer-readable medium according to claim 22, wherein said correction step corrects the input image data by rotating the image data.

* * * * *